T. J. CARRICK.
Universal Joint and Clamp.
No. 167,603. Patented Sept. 14, 1875.
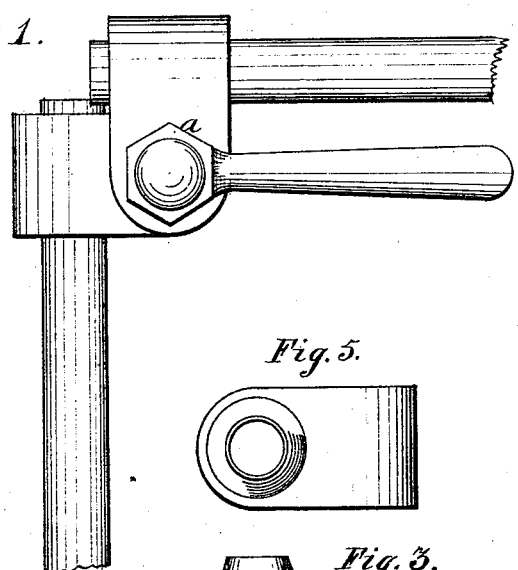
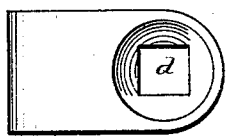
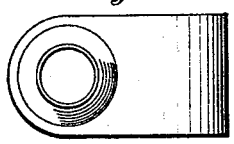
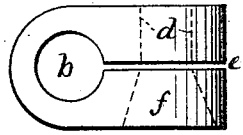
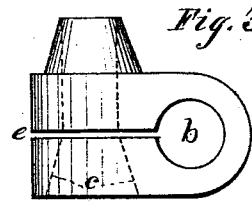
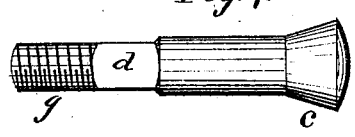
Witnesses:
Wm. T. Steveson
W. H. Hayward
Inventor:
Thomas J. Carrick

UNITED STATES PATENT OFFICE.

THOMAS J. CARRICK, OF BALTIMORE, MARYLAND, ASSIGNOR TO HENRY SNOWDEN AND CHARLES H. COWMAN, OF SAME PLACE.

IMPROVEMENT IN UNIVERSAL JOINTS AND CLAMPS.

Specification forming part of Letters Patent No. 167,603, dated September 14, 1875; application filed May 25, 1875.

*To all whom it may concern:*

Be it known that I, THOMAS J. CARRICK, of the city of Baltimore and State of Maryland, have invented an Improvement in Universal Joints and Clamps, of which the following is a specification:

My invention of clamping-blocks, a screw-bolt, and a nut, to make a universal joint and clamps, has for its purpose the fastening an object in any desired position by a single movement of a nut, instantaneously and firmly.

Figure 1 is a plan view of my invention with all its parts in position. Figs. 2 and 3 are views of corresponding sides of the two clamping-blocks, with the holes to receive rods to be clamped and the slits to be compressed by the screw-bolt. Fig. 4 is a view of clamping-block, Fig. 2, at right angles to the latter, and showing a cone-seat, and a square to receive the corresponding part of a bolt, Fig. 7. Fig. 5 is a view of clamping-block, Fig. 3, at right angles to the latter, showing position of cone to fit cone-seat, in Fig. 2. Fig. 6 is a nut to engage screw-bolt, Fig. 7, and bind the clamping-blocks together. Fig. 7 is a screw-bolt with a coned head and a square, and a screw to pass through both clamping blocks across the slits, and compress the same. Any equivalent device may replace the square.

$a$, Fig. 1, is a screw-nut engaging the thread of the screw-bolt, Fig. 7, which, by a single movement, by compressing the clamps toward the slits, respectively, secures any position desired to be given to my universal joint. $b$, Figs. 1, 2, and 3, are holes to receive rods or any object to be clamped. $c$, Figs. 1 and 7, is the coned head of the screw-bolt, Fig. 7. $d$ is the location, in dotted lines, of the square in clamping-block, Figs. 1 and 2, and shown in Fig. 4. $e$, Figs. 1, 2, and 3, are the slits in clamping - blocks, to be compressed by the action of the screw-bolt, Fig. 7. $f$, Fig. 3, is a hollow cone or sleeve, a portion of the metal of clamping-block, Fig. 3, and fitted to a coned seat, $f$, in dotted lines, in block, Fig. 2; also in Figs. 1 and 5. $f$, Fig. 4, is the coned seat, ended by a square, shown at $f$ in dotted lines in Fig. 2. $g$, Fig. 7, is a screw engaging nut, Fig. 6, to clamp and bind my universal joint. $d$, Fig. 7, is a square in the bolt to prevent any rotating movement at that part of said bolt. The square hole to receive the bolt is shown as $d$, Fig. 4, and in dotted lines, $d$, Figs. 1 and 2. $c$, Fig. 7 and Fig. 1, is a conical bolt-head fitted to seat $c$, in dotted lines in Figs. 1 and 3.

It is obvious that a hinge in hole $b$, Figs. 1, 2, and 3, would accomplish a similar result, but in an inferior manner.

I do not claim clamping-blocks with slits in them, for such are not new.

I claim—

A combination of clamping - blocks, with projecting coned sleeves, and cone-seats to fit, with a screw-bolt and nut, to clamp and fasten by a single half-turn of said nut, to form a universal joint and clamp.

THOMAS J. CARRICK.

Witnesses:
 WM. F. EBERWEIN,
 W. H. HAYWARD.